(12) United States Patent
Muylaert et al.

(10) Patent No.: US 8,235,665 B2
(45) Date of Patent: Aug. 7, 2012

(54) SCULPTURED THROAT SPOOL

(75) Inventors: Neal W. Muylaert, Apache Junction, AZ (US); Lyndon C. Lamborn, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 960 days.

(21) Appl. No.: 12/187,599

(22) Filed: Aug. 7, 2008

(65) Prior Publication Data

US 2010/0034654 A1    Feb. 11, 2010

(51) Int. Cl.
*B64C 11/12* (2006.01)
*F01D 5/00* (2006.01)
*B21K 3/04* (2006.01)

(52) U.S. Cl. ...................... 416/135; 29/889.6

(58) Field of Classification Search ............ 416/140, 416/134 A, 170 R, 35, 141, 114; 29/889.6
See application file for complete search history.

(56) References Cited

U.S. PATENT DOCUMENTS

| | | | | |
|---|---|---|---|---|
| 3,460,628 A | * | 8/1969 | Tankersley | 416/213 R |
| 3,520,637 A | * | 7/1970 | Tobey | 416/135 |
| 4,242,048 A | * | 12/1980 | McArdle | 416/134 A |
| 4,427,340 A | * | 1/1984 | Metzger et al. | 416/141 |
| 2005/0269449 A1 | * | 12/2005 | Muylaert et al. | 244/100 R |

* cited by examiner

*Primary Examiner* — A. Sefer
*Assistant Examiner* — Nikolay Yushin
(74) *Attorney, Agent, or Firm* — Caven & Aghevli LLC

(57) ABSTRACT

A sculpted throat spool of a tension-torsion strap assembly is disclosed. Using the sculpted throat spool minimizes the stress riser typically present at the edge of the spool when a tension-torsion strap is articulated.

21 Claims, 5 Drawing Sheets

SCULPTURED THROAT SPOOL

TECHNICAL FIELD

The field of the present disclosure relates to eliminating a stress riser in a tension-torsion strap assembly.

BACKGROUND

The rotor system of a rotary aircraft, such as a helicopter, is the rotating part which generates lift of the aircraft. A helicopter's rotating wing assembly is normally called the main rotor, providing vertical lift of the helicopter. Traditionally, a main rotor consists of a mast, hub, and rotor blades, where the rotor blades are fastened on the hub by a tension-torsion strap assembly.

The usual way to provide a rotational force to the body of helicopter is to attach another set of rotating wings. These rotating wings are known as a tail rotor. The tail rotor produces thrust. By producing thrust in a sideways direction, the tail rotor keeps the body of the helicopter from spinning. Typically, the tail rotor consists of the same parts as those found in the main rotor.

While a rotary aircraft, such as a helicopter, is in flight the rotor blades tend to move radially outward due to centripetal force. The rotor blades are held in place against this outward motion by tension of the tension-torsion straps. Also, tension-torsion straps fastening the blades to the hub of the rotor system are articulated as the pitch of the aircraft is changed. A typical tension-torsion strap assembly consists of a spool having a central cylindrical spindle with a circular plate (or flange) at each end, with a strap wound around the spool. The articulation of the tension-torsion strap assembly creates a stress riser, both in tensile stresses and bearing stresses, at the edge of the spool when the wound material (i.e., the strap) is abruptly bent over the edge of the spool, resulting in potential damage of the strap.

SUMMARY

One or more embodiments of the present invention describe apparatus and systems for reducing stress risers in tension-torsion strap assemblies. Embodiments of the present invention provide ways for an aircraft to adjust the pitch of the blade while maintaining the integrity of the rotor system.

The features, functions, and advantages that are discussed above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Overview

The present disclosure discloses an apparatus for minimizing stresses when a strap-like material is wound around the spool of a tension-torsion system. This disclosure describes sculpting the spool to minimize alternating tensile stress and bearing stress when the strap-like material of a tension-torsion strap assembly is being articulated or twisted. Thus, the sculpting of the spool minimizes the alternating tensile and peak stresses in the material as the strap twists.

In one specific example, a tension-torsion strap assembly including a sculptured throat spool according to one embodiment, is described in the context of connecting rotor blades to a rotor of a rotary aircraft, such as a helicopter. However, the concepts described herein are applicable to other applications employing a tension-torsion connection, and are not limited to rotary aircraft applications. For example, other applications may include, without limitation, a variable pitch fan used for ventilation, a windmill, a wind machine, an amusement park ride, a ship propeller system, a suspension bridge, and the like.

Many specific details are set forth in the following description and in FIGS. 1-5 to provide a thorough understanding of an embodiment. One skilled in the art will understand, however, that additional embodiments are possible and it may be practiced without one or more of the details described in the following description.

Figure 1:
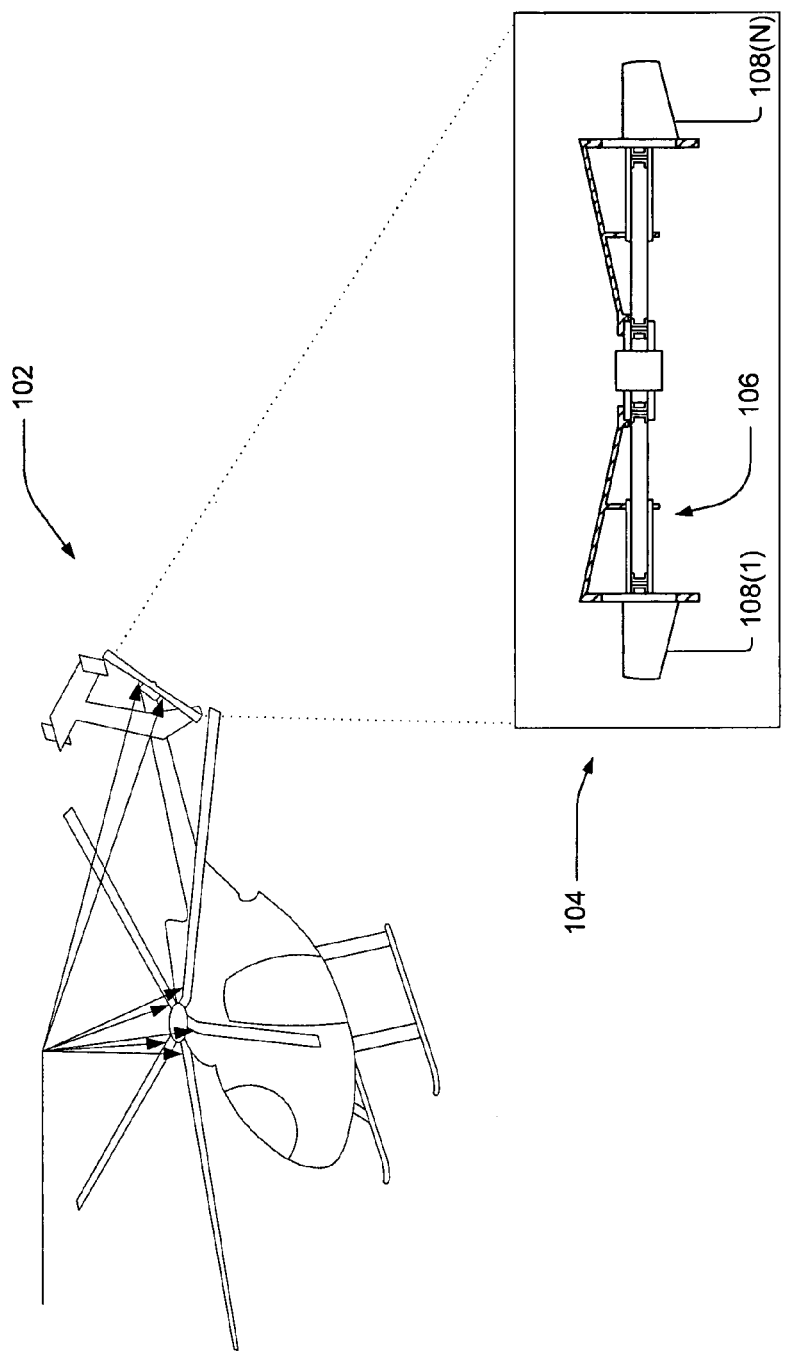
FIG. 1 illustrates a helicopter rotor system.

FIG. 1 illustrates a tension-torsion strap assembly of an exemplary aircraft, for example a helicopter 102, including a sculptured throat spool. A helicopter 102, as shown in FIG. 1, is an aircraft that is lifted and propelled by one or more horizontal and vertical rotors, each rotor consisting of two or more rotor blades. The tail rotor 104 is a smaller rotor mounted vertically or substantially vertical on the tail of a traditional helicopter. The tail rotor 104 may include a tension-torsion strap assembly 106. The tension-torsion strap assembly, discussed in more detail below, may be situated adjacent to blades 108(1)-108(N) to counter the torque generated during lift of the aircraft.

Figure 2:
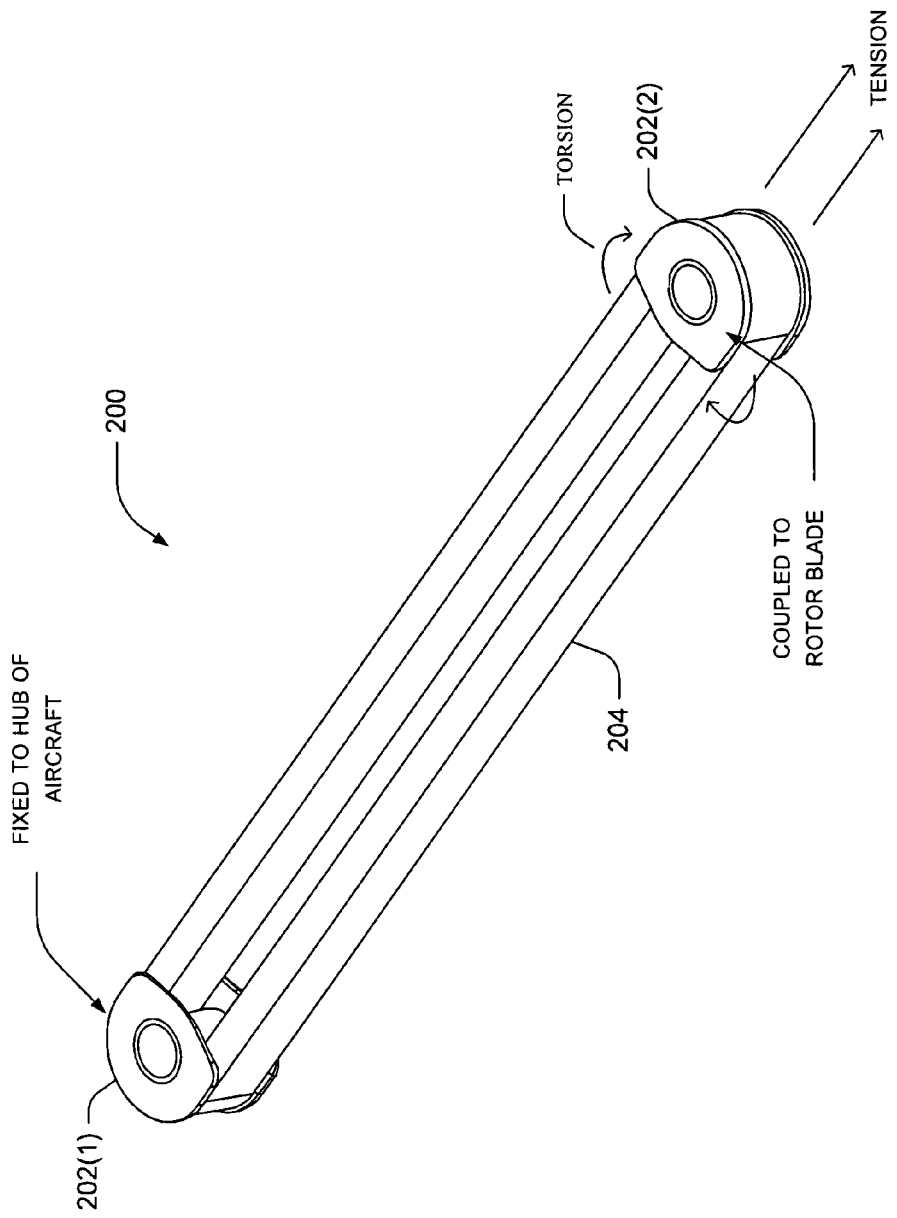
FIG. 2 illustrates a tension-torsion strap assembly, including an illustrative sculptured throat spool, according to one implementation.

FIG. 2 illustrates a tension-torsion strap assembly 200 in accordance with the present teachings. Tension-torsion strap assembly 200 includes, without limitation, first spool 202(1) fixed to the hub of the aircraft, second spool 202(2) coupled to the rotor blades of the aircraft, and strap 204. Strap 204 is disposed between and mechanically couples the first spool and the second spool. Tension-torsion strap assemblies may be used, for example, in aircraft 102 to counter the centripetal force of spinning blades 108(1)-108(N). Additionally, the tension-torsion strap assembly permits for changing the pitch of the blades by allowing torsional twisting of one end of strap 204 relative to the other end as well as tension related to articulation of the strap 204.

Figure 3:
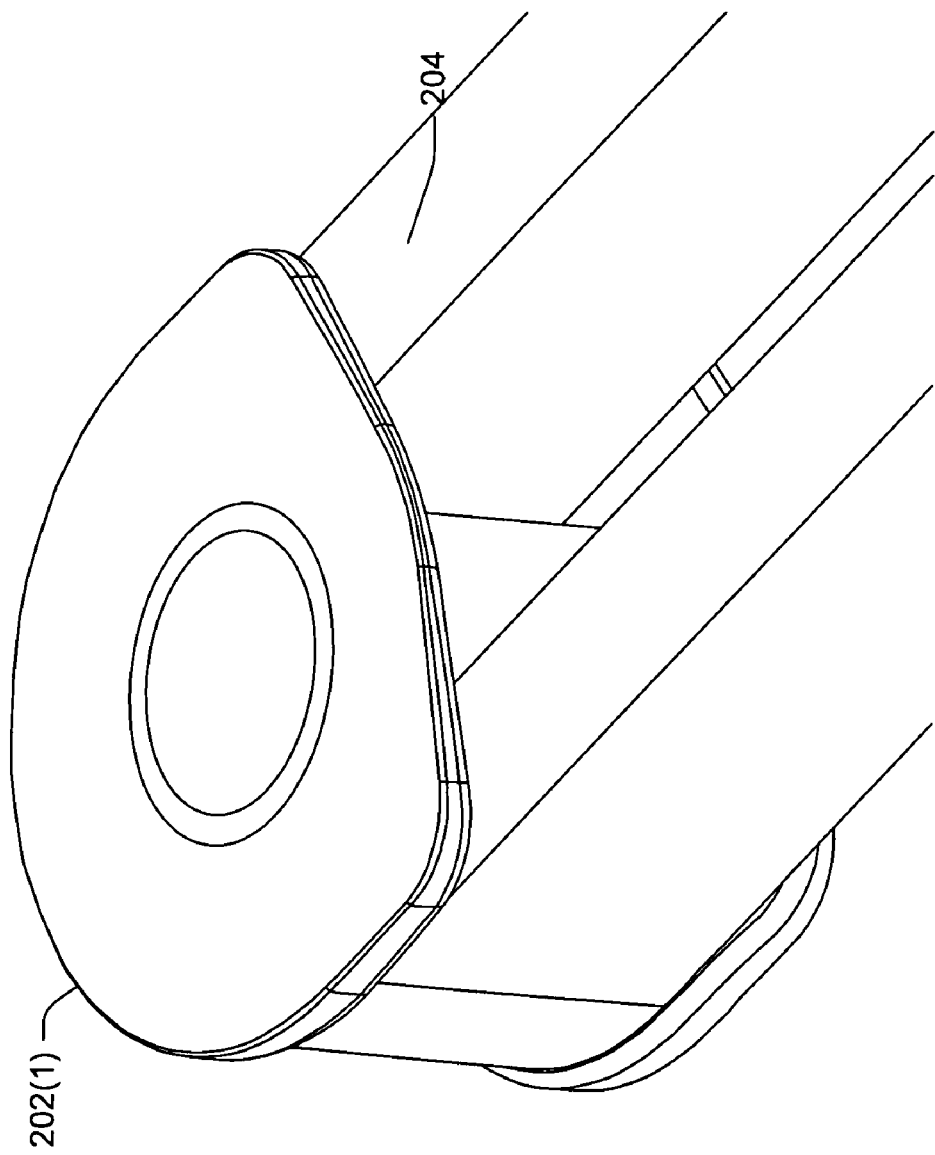
FIG. 3 illustrates one of the sculptured throat spools of the tension-torsion strap assembly of FIG. 2 in more detail.

FIG. 3 is a top perspective view of spool 202(1) in more detail. Strap 204 engages first spool 202(1) by way of being wound, at least partially, around spool 202(1). Typically, the strap 204 is very strong and stiff axially, but has low torsional stiffness. The strap 204 may be made of a fibrous material such as Kevlar. In other implementations, strap 204 may be made of metallic wire, fiberglass, graphite, carbon fibers, and other materials. In any case, the strap 204 defines a continuous loop of material.

Figure 4:
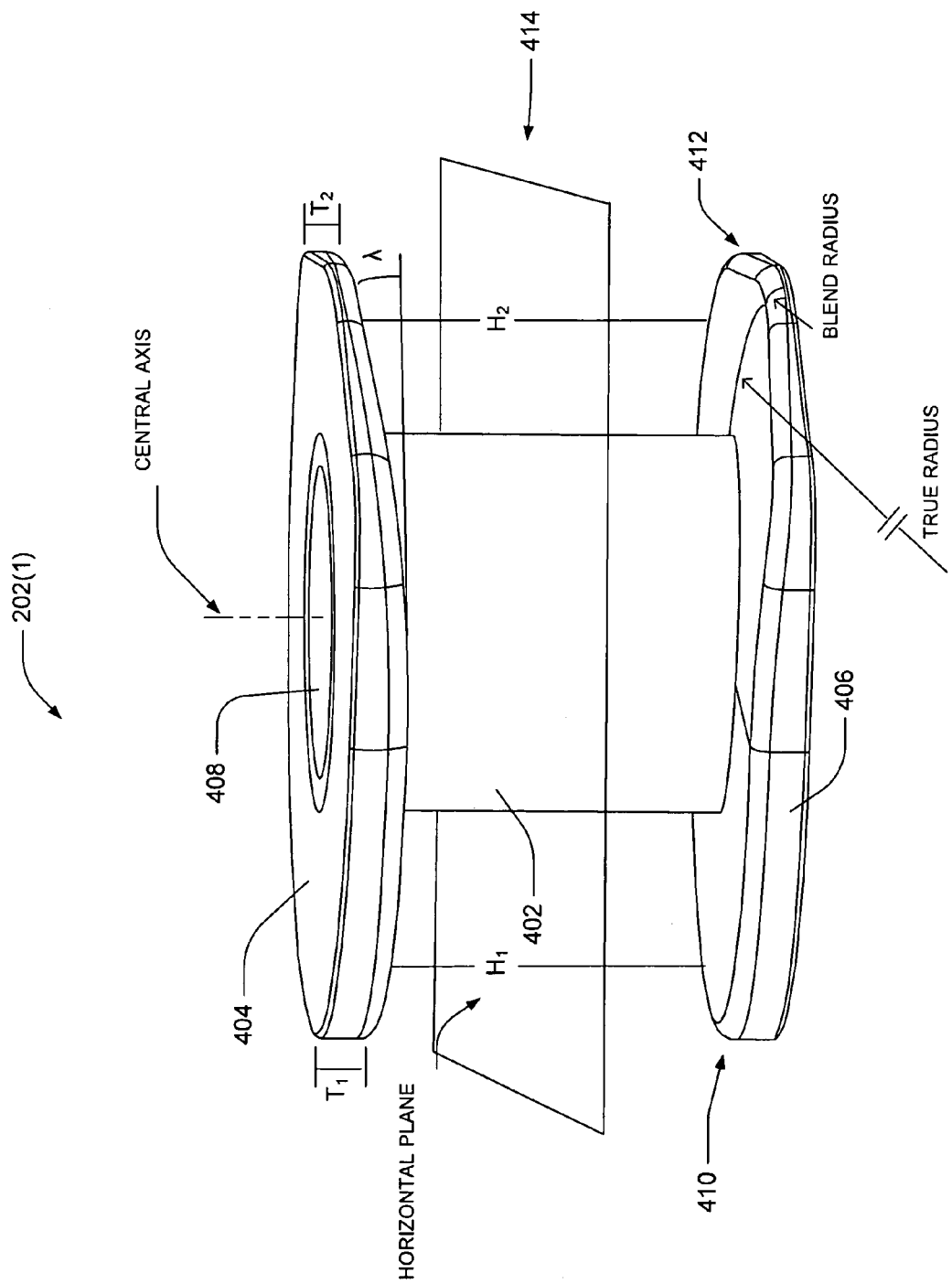
FIG. 4 is a side elevation view of the sculptured throat spool of FIG. 3.

FIG. 4 illustrates spool 202(1) in more detail. The spool 202(1) includes, without limitation, spindle 402, first plate 404, second plate 406, and through aperture 408. Spindle 402 is fixedly disposed between the first plate 404 and the second plate 406. A central axis extends through spindle 402. In one implementation, the first plate 404 and the second plate 406 are positioned symmetrically about a horizontal plane extending through the spindle 402 and may be defined by a first height $H_1$ and a second height $H_2$. In alternative implementations, the first plate 404 and the second plate 406 may be situated asymmetrically. The perimeter of the first plate 404 and the second plate 406 may be further defined by two distinct portions, a semi-circular edge portion 410 and a linear edge portion 412. In other implementations, the first plate and the second plate may be defined by any other edge portion that may reduce stresses in the strap 204 fibers. The linear edge portions 412 of the first plate and the second plate are adjacent to a throat portion 414 of spool 202(1). As illustrated in FIG. 2, the throat portion 414 of the first spool 202(1) faces the throat portion 414 of the second spool 202(2). The strap 204 extends away from the first spool 202(1) and the second spool 202(2) through the throat portion of the spool and is wound between the first plate 404 and second plate 406 of the respective spool.

As shown in FIG. 4, the throat portion of the first spool 202(1) and the second spool 202(2) may be further defined by a sloped contour λ. The sloped contour may be found on the interior surface of the first plate and/or the second plate. In one implementation, the sloped contour is defined by a profile true radius of about 5.0 inches with an edge blend radius of about 0.04 inches, as shown in FIG. 4. In another implementation, the true radius may be between about 2 inches and about 8 inches with an edge blend radius of about 0.02 inches to about 0.06 inches. However, in other implementations the profile shape may be parabolic, elliptical, or any other geometric configuration and may have any desired radius of curvature or slope.

Figure 5:
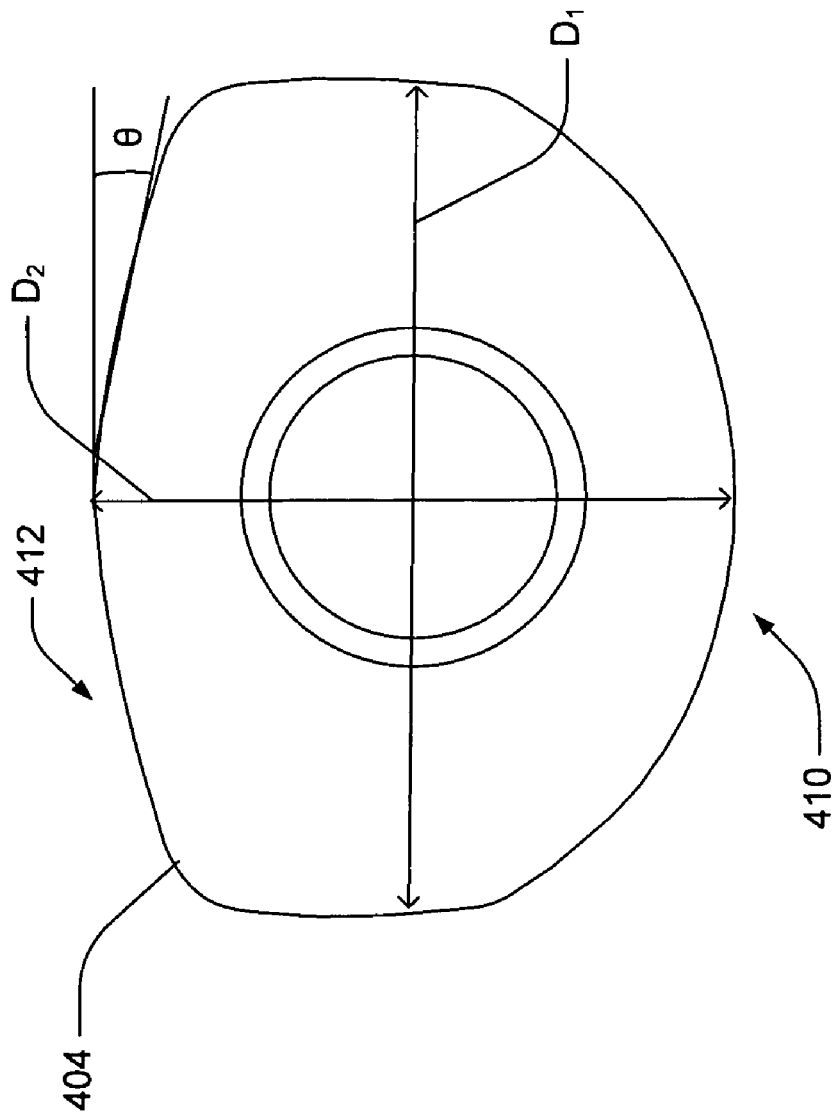
FIG. 5 is a top view of the sculptured throat spool of FIG. 3.

FIG. 5 illustrates the perimeter of the first plate 404 and the second plate 406 may be defined by a first diameter $D_1$ and an orthogonal second diameter $D_2$. In one implementation, $D_1$ is not equal to $D_2$. In one implementation, $D_1$ is about 1.5 inches to 2.0 inches and $D_2$ is about 1.2 inches to 1.8 inches. In another implementation, $D_1$ is about 2.0 inches and $D_2$ is about 1.7 inches. In another implementation, $D_1$ may equal $D_2$. The first plate 404 and second plate 406 are further defined by angle θ. In one implementation, the angle is about 15°. In other implementations, the angle may range from about 5o to about 25°. In other implementations the planform perimeter may be circular, elliptical or other geometric shape.

By way of further example, FIG. 4 illustrates an example in which the first plate 404 and the second plate 406 transition from a semi-circular edge portion consisting of a first thickness $T_1$ to a linear edge portion consisting of a second thickness $T_2$. The transition from the first thickness $T_1$ to the second thickness $T_2$ is represented by the slope λ of the interior surface of the first plate 404 and the second plate 406. As a result, illustrative spool 202(1) will minimize tensile and bearing stresses in the strap fibers immediately adjacent to the spool plates 404, 406 and the strap 204, during articulation of the strap 204. Although specific dimensions have been illustrated and described herein, other dimensions may be used in accordance with a manufacturing process and/or aircraft requirement as necessary or desired.

The spool 202(1) may be machined out of a single piece of material using a conventional machining process. Alternatively, the spool may be manufactured in parts and then assembled again using a conventional manufacturing and assembly process. In one example, the plates 404 and 406 may be machined and then attached to the spindle 402 by a press fit, welding, or any other suitable technique or process.

Although the subject matter has been described in language specific to structural features and/or methodological acts, it is to be understood that the subject matter defined in the appended claims is not necessarily limited to the specific features or acts. While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. An aircraft comprising:
   a blade;
   a hub;
   a tension-torsion strap assembly coupling the blade to the hub, the tension-torsion strap assembly comprising:
      at least a first sculptured spool and at least a second sculptured spool, the first and second sculptured spools each comprising:
      a spindle having a first end and a second end;
      a first plate at a first end of the spindle and a second plate at a second end of the spindle, wherein an interior surface of the first plate proximate the first end of the spindle and an interior surface of the second plate proximate the second end of the spindle comprises a sloped contour wherein the sloped contour of the first plate or the second plate comprises a true radius between about 2 inches and 6 inches with an edge blend radius between about 0.02 inches to about 0.06 inches; and
   a strap wound around the first sculptured spool and the second sculptured spool, wherein the strap is formed from a material having a low torsional stiffness, and wherein the sloped contour reduces tensile and bearing stresses in portions of the strap adjacent the spool plates during articulation of the strap.

2. The aircraft of claim 1, wherein the blade generates a vertical lift or a horizontal thrust.

3. The aircraft of claim 1, wherein the sloped contour of the first plate or the second plate comprises a true radius that measures approximately 5.0 inches with a blend radius that measures approximately 0.04 inches.

4. The aircraft of claim 1, wherein, for each spool, an edgewise perimeter of the first plate and the second plate comprises a semi-circular edge portion and first and second linear edge portions that intersect at a curved section which defines a throat portion of the spool.

5. The aircraft of claim 4, wherein the first plate and the second plate further comprises a first diameter which measures between 1.5 to 2.0 inches and a second diameter which measures between 1.2 to 1.8 inches, wherein the first diameter is orthogonal to the second diameter.

6. The aircraft of claim 4, wherein, for each spool, the one or more linear edge portions extend along an axis which defines an angle θ that measures between 5.0 and 25.0 degrees.

7. A sculptured throat spool, the spool comprising:
   a spindle having:
      a first end, a second end, and a central axis, wherein the central axis extends through an aperture of the spindle from the first end to the second end; and
      a first plate fixedly attached to the first end of the spindle, wherein an interior surface of the first plate proximate the first end of the spindle comprises a sloped contour wherein the sloped contour of the first plate or the second plate comprises a true radius between about 2 inches and 6 inches with an edge blend radius between about 0.02 inches to about 0.06 inches; and a second plate fixedly attached to the second end of the spindle, wherein an interior surface of the second plate proximate the second end of the spindle comprises a sloped contour, wherein the sloped contour of the first plate and the sloped contour of the second plate reduces tensile and bearing stresses in portions of the strap adjacent the spool plates during articulation of the strap.

8. The spool of claim 7, wherein a range of the sloped contour of the first plate or the second plate comprises a true radius that measures approximately 5.0 inches with a blend radius that measures approximately 0.04 inches.

9. The spool of claim 7, wherein the sloped contour of the first plate and the second plate comprises a true radius that measures approximately 5.0 inches with a blend radius that measures approximately 0.04 inches.

10. The spool of claim 7, wherein an edgewise perimeter of the first plate and the second plate comprises a semi-circular edge portion and first and second linear edge portions that intersect at a curved section which defines a throat portion of the spool.

11. The spool of claim 9, wherein the first plate and the second plate further comprises a first diameter which measures between 1.5 to 2.0 inches and a second diameter which measures between 1.2 to 1.8 inches, wherein the first diameter is orthogonal to the second diameter.

12. The spool of claim 10, wherein each of the first plate and the second plate comprises a semi-circular edge portion adjacent the first thickness and first and second linear edge portions that intersect at a curved section which defines a throat portion of the spool.

13. A tension-torsion strap assembly, the assembly comprising:

a first spool and a second spool, wherein the first spool and the second spool each comprise:
    a spindle having a first end and a second end;
    a first plate at the first end of the spindle and a second plate at the second end of the spindle, wherein an interior surface of the first plate proximate the first end and an interior surface of the second plate proximate the second end each comprise a sloped contour wherein the sloped contour of the first plate or the second plate comprises a true radius between about 2 inches and 6 inches with an edge blend radius between about 0.02 inches to about 0.06 inches; and
a strap wound around the first spool and the second spool, wherein the strap is formed from a material having a low torsional stiffness, and wherein the sloped contour reduces tensile and bearing stresses in portions of the strap adjacent the spool plates during articulation of the strap.

14. The assembly of claim 13, wherein the sloped contour of the first plate is substantially equal to the sloped contour of the second plate.

15. The assembly of claim 13, wherein a range of the sloped contour of the first plate or the second plate comprises a true radius that measures approximately 5.0 inches with a blend radius that measures approximately 0.04 inches.

16. The assembly of claim 13, wherein the spindle is disposed between and mechanically couples the first plate and the second plate.

17. The assembly of claim 13, wherein the strap comprises a fibrous material.

18. A method of attaching a blade to a hub, the method comprising:

joining at least a first sculptured spool and at least a second sculptured spool, wherein the at least first sculptured spool and the at least second sculptured spool each comprise:
    a spindle having a first end and a second end;
    a first plate at the first end of the spindle and a second plate at the second end of the spindle, wherein an interior surface of the first plate proximate the first end, and an interior surface of the second plate proximate the second end, each comprise a sloped contour wherein the sloped contour of the first plate or the second plate comprises a true radius between about 2 inches and 6 inches with a blend radius between about 0.02 inches to about 0.06 inches; and
coupling a strap between the at least first sculptured spool to the at least second sculptured spool, wherein the strap is formed from a material having a low torsional stiffness, and wherein the sloped contour reduces tensile and bearing stresses in portions of the strap adjacent the spool plates during articulation of the strap.

19. The assembly of claim 13, wherein an edgewise perimeter of the first plate and an edgewise perimeter of the second plate each comprise a semi-circular edge portion and first and second linear edge portions that intersect at a curved section which defines a throat portion of the spool.

20. The assembly of claim 19, wherein, for each spool, the one or more linear edge portions define a throat portion, wherein the throat portion expands in a direction away from a central axis of the spindle.

21. The assembly of claim 20, wherein the throat portion of the first spool faces the throat portion of the second spool.

* * * * *